United States Patent
Wang et al.

(10) Patent No.: US 9,598,557 B2
(45) Date of Patent: Mar. 21, 2017

(54) STABLE AQUEOUS HYBRID BINDER

(75) Inventors: Yujiang Wang, Shanghai (CN);
Jianming Xu, Shanghai (CN); Ravi Mukkamala, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 95 days.

(21) Appl. No.: 14/349,108

(22) PCT Filed: Oct. 21, 2011

(86) PCT No.: PCT/CN2011/081099
§ 371 (c)(1),
(2), (4) Date: Apr. 2, 2014

(87) PCT Pub. No.: WO2013/056464
PCT Pub. Date: Apr. 25, 2013

(65) Prior Publication Data
US 2014/0256871 A1    Sep. 11, 2014

(51) Int. Cl.
*C08L 33/02* (2006.01)
*C08K 3/36* (2006.01)
*C09D 133/12* (2006.01)
*C09D 133/26* (2006.01)

(52) U.S. Cl.
CPC .............. *C08K 3/36* (2013.01); *C09D 133/12* (2013.01); *C09D 133/26* (2013.01)

(58) Field of Classification Search
CPC ....... C09D 133/12; C09D 133/26; C08K 3/36
See application file for complete search history.

(56) References Cited

U.S. PATENT DOCUMENTS

| | | | |
|---|---|---|---|
| 2,630,410 A | 3/1953 | Clapsadle et al. | |
| 2,918,391 A * | 12/1959 | Hornibrook | C09D 125/14 428/463 |
| 3,206,421 A * | 9/1965 | Victorius | C08F 8/44 428/460 |
| 3,753,769 A * | 8/1973 | Steiner | C08J 7/047 428/331 |
| 4,960,802 A | 10/1990 | DiStefano | |
| 5,368,833 A | 11/1994 | Johansson et al. | |
| 6,020,415 A | 2/2000 | Guerra, Jr. | |
| 6,022,919 A | 2/2000 | Komoto et al. | |
| 6,271,292 B1 | 8/2001 | Mager et al. | |
| 6,329,060 B1 | 12/2001 | Barkac et al. | |
| 6,380,265 B1 | 4/2002 | Pryor et al. | |
| 6,756,437 B1 | 6/2004 | Xue et al. | |
| 7,393,901 B1 | 7/2008 | Filiatrault et al. | |
| 7,511,090 B2 | 3/2009 | Wiese et al. | |
| 7,544,726 B2 | 6/2009 | Greenwood | |
| 7,652,095 B2 | 1/2010 | Filiatrault et al. | |
| 2002/0173561 A1 | 11/2002 | Field | |
| 2009/0111910 A1 | 4/2009 | Gimvang | |
| 2009/0149591 A1 | 6/2009 | Yang et al. | |
| 2009/0163618 A1 | 6/2009 | Muenzmay et al. | |
| 2012/0142850 A1 | 6/2012 | Muhlebach et al. | |
| 2015/0152282 A1 | 6/2015 | Wang et al. | |

FOREIGN PATENT DOCUMENTS

| | | |
|---|---|---|
| CN | 101067069 A | 11/2007 |
| EP | 0811663 A2 | 12/1997 |
| EP | 1554221 A1 | 7/2005 |
| JP | 4300980 B2 | 7/2009 |

OTHER PUBLICATIONS

John Wiley & Sons (1979); The Chemistry of Silca; Iler K. Ralph, pp. 407-409.
Iler, R. K. & Dalton, R. L.; J. Phys Chem. 60 (1956), pp. 955-957.

* cited by examiner

*Primary Examiner* — Vu A Nguyen
(74) *Attorney, Agent, or Firm* — Karl E. Stauss; Cantor Colburn LLP

(57) ABSTRACT

The present invention provides a new and simple processed stable colloidal silica containing polymeric binders, without modification, and to get to a novel coating composition, especially, aqueous coating composition that has more efficient stain resistance/removal function and also under a reasonable and controllable cost.

8 Claims, No Drawings

STABLE AQUEOUS HYBRID BINDER

BACKGROUND

This invention relates to a stable aqueous hybrid binder containing colloidal silica, and the use thereof.

Colloidal silica have been used for a long time, e.g. as a coating material to improve adhesive properties as well as increasing wear and water resistance of various materials. However, these dispersions, especially highly concentrated colloidal silica dispersions, are liable to gelling or precipitation of silica, which makes longer storage impossible.

Colloidal silica in polymeric coatings can improve properties such as scratch resistance, UV protection or conductivity in a targeted manner. Control of the surface modification and dispersing of the colloidal silica determines the required transparent appearance of the coatings and properties thereof.

Various approaches have been pursued in the past for introduction of the colloidal silica into coating composition formulations. The colloidal silica can be mixed directly into the resin or curing agent component or into the coating composition ready for application. In aqueous systems there is the possibility of dispersing the colloidal silica in the aqueous phase. The in situ preparation of the colloidal silica in one of the binder components and adaptation of the surface to either the resin or the curing agent component have furthermore been described.

From the practical point of view, it is advantageous to disperse the colloidal silica as stable masterbatches in one of the components, so that a long-term storage stability and a simple ease of handling in the formulation of lacquers is ensured. In the end use, the colloidal silica must likewise be readily dispersible in a finely divided manner, so that advantageous properties such as transparency, scratch resistance or conductivity result.

In practice, the colloidal silica is conventionally dispersed into the resin component, into the aqueous phase or into the finished mixture of curing agent and resin shortly before curing. As a rule, for this it is necessary to adapt the surface of the colloidal silica to the specific matrix of the coating composition or of the adhesive. The disadvantage of simple mixing in of modified colloidal silica is the dependency of the stability on the complete formulation, i.e. on all the formulation constituents. Variation of one parameter can lead here to demixing (Pilotek, Steffen; Tabellion, Frank (2005), European Coatings Journal, 4, 170 et seq.).

US20090163618A1 claims aqueous binder dispersions based on silane-modified polymeric binders and inorganic nanoparticles, a process for the preparation thereof and the use thereof for the production of high quality coatings, in particular clear lacquers.

WO2001018081A1 claims a method for producing an aqueous dispersion of composite particles made up of polymerisate and fine inorganic solid material. According to said method, at least one ethylenically unsaturated monomer is dispersed in an aqueous medium and polymerised using at least one radical polymerisation initiator, in the presence of at least one dispersed, fine inorganic solid material and at least one dispersing agent, according to the radical aqueous emulsion polymerisation method.

The method in the prior art require special silanization for the polymer, or run in-situ polymerization in the presence of special dispersant.

It is therefore, still desired in the technical field, a new and simple processed stable colloidal silica containing polymeric binders, without modification, and to get to a novel coating composition, especially, aqueous coating composition that has more efficient stain resistance/removal function and also under a reasonable and controllable cost.

STATEMENT OF INVENTION

The present invention provides a stable aqueous hybrid binder comprising a) at least one water dispersible or soluble polymer, comprising from 1 to 10 wt %, by weight based on the dry weight of the polymer, as copolymerized units of an ethylenically unsaturated monomer carrying at least one functional group; and b) at least one colloidal silica; wherein the surface acid value of the water dispersible or soluble polymer is from 1.0 to 4.0 mg KOH/g dried polymer, the serum phase acid value is from 0 to 2.3 mg KOH/g dried polymer, and the final pH value of the hybrid binder is equal or above 8.5 by using neutralizer.

It further provides a coating composition comprising the binder.

DETAILED DESCRIPTION

For the purpose of describing the components in the compositions of the present invention, all phrases comprising parenthesis denote either or both of the included parenthetical matter and its absence. For example, the phrase "(co)polymer" includes, in the alternative, polymer, copolymer and mixtures thereof; the phrase "(meth)acrylate" means acrylate, methacrylate, and mixtures thereof.

As used herein, the term "aqueous" shall mean water or water mixed with 50 wt % or less, based on the weight of the mixture, of water-miscible solvent.

As used herein, the term "polymer" shall include resins and copolymers.

As used herein, the term "acrylic" shall mean (meth)acrylic acid, (meth)alkyl acrylate, (meth)acrylamide, (meth)acrylonitrile and modified forms thereof, such as, for example, (meth)hydroxyalkyl acrylate.

As used herein, unless otherwise indicated, the term "average particle size (or diameter)" refers to the median particle size (or diameter) of a distribution of particles as determined by electrical impedance using a MULTI-SIZER™ 3 Coulter Counter (Beckman Coulter, Inc., Fullerton, Calif.), per manufacturer's recommended procedures. The median is defined as the size wherein 50 wt % of the particles in the distribution are smaller than the median and 50 wt % of the particles in the distribution are larger than the median. This is a volume average particle size.

As used herein, unless otherwise indicated, the term "Tg" shall mean glass transition temperature measured by differential scanning calorimetry (DSC) using a heating rate of 20° C./minute and taking the inflection point in the thermogram as the Tg value. The term "calculated Tg" refers to the Tg of polymers determined via the Fox equation (T. G. Fox, Bull. Am. Physics Soc., Volume 1, Issue No. 3, page 123(1956)). The Tgs of homopolymers may be found, for example, in "Polymer Handbook", edited by J. Brandrup and E. H. Immergut, Interscience Publishers. In the case of a multi-stage polymer, the reported Tg value shall be the weighted average of the observed inflection points in the thermogram. For example, a two stage polymer consisting of 80% soft first stage and 20% hard second stage polymer having two DSC inflection points, one at −43° C. and one at 68° C., will have a reported Tg of −20.8° C.

The term "acid value" refers to the amount of acid as determined by how much potassium hydroxide is needed between two peaks of the first derivatives of the potentiometric acid-base titration curve, per amount of dried polymer.

The aqueous hybrid binder of the present invention contain one or more water dispersible or soluble polymers, with an average particle diameter of from 50 to 800 nm, a minimum film formation temperature of from −35° C. to 60° C., and a surface acid value of from 1.0 to 4.0 mg KOH/g dried polymer, the serum phase acid value of from 0 to 2.3 mg KOH/g dried polymer.

During the synthesis of copolymer, acid distributes in serum phase, surface of particle or buried in the particle. The surface acid value is defined as the acid part distributed in surface of particle, and the serum phase acid value is defined as acid part distributed in serum phase. Serum phase acid part is separated and collected by spinning down the latex (using centrifugation method) and protonated by hydrogen chloride solution. The latex is then re-dispersed in water and protonated by hydrogen chloride solution. After treatment, the surface acid value and serum phase acid value of the said polymer can be measured separately by measuring the graph of the relationship between a potassium hydroxide (KOH) additional amount and an electric conductivity. The surface acid value and serum phase acid value are computable from KOH additional amount between two peaks of the first derivatives of the titration curve.

In the present invention, water dispersible or soluble polymer with a surface acid value being from 1.0 to 4.0 mg KOH/g dried polymer, the serum phase acid value is from 0 to 2.3 mg KOH/dried polymer is used. More preferably, the surface acid value of the water dispersible or soluble polymer is from 1.75 to 3.43 mg KOH/g dried polymer, and the serum phase acid value is from 0.07-1.5 mg KOH/g dried polymer.

The water dispersible or soluble polymers are copolymerized from the ethylenically unsaturated nonionic monomers. Herein, "nonionic monomer" means that the copolymerized monomer residue does not bear an ionic charge between pH=1-14. The ethylenically unsaturated nonionic monomers used in this invention include, for example, (meth)acrylic ester monomers, where (meth)acrylic ester designates methacrylic ester or acrylic ester, including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; (meth)acrylamide; amino-functional and ureido-functional monomers; monomers bearing acetoacetate-functional groups; styrene and substituted styrenes; butadiene; ethylene, propylene, α-olefins such as 1-decene; vinyl acetate, vinyl butyrate, vinyl versatate and other vinyl esters; and vinyl monomers such as vinyl chloride, vinylidene chloride.

The water dispersible or soluble polymers of the present invention further comprises up to 10 wt %, preferably up to 5 wt %, more preferably up to 2.5 wt %, by weight based on the dry weight of the polymer, of an ethylenically unsaturated monomer carrying at least one functional group selected from carboxyl, carboxylic anhydride, hydroxyl, amide, sulphonate, phosphonate and mixtures thereof. Examples of these types of monomers are ethylenically unsaturated carboxylic or dicarboxylic acids, especially acrylic or methacrylic acid, itaconic acid, maleic acid, or the amides, especially N-alkylolamides or hydroxyalkyl esters of the above-mentioned carboxylic acids, such as (meth)acrylamide, N-methylol(meth)acrylamide, 2-hydroxyethyl (meth) acrylamide, hydroxyethyl (meth)acrylate, and hydroxypropyl (meth)acrylate. More preferably, the functional monomer is methacrylic acid, acrylic acid, acrylamide, methacrylamide. Most preferably, the functional monomer is methacrylic acid.

Optionally, the copolymer may further comprise, as copolymerized units, from 0 to 0.5 wt %, preferably from 0.05 wt % to 0.4 wt %, more preferably from 0.1 wt % to 0.3 wt %, at least one ethylenically unsaturated monomer having at least one alkoxysilane functionality, preferable hydrolyzable alkoxysilane functionality. The alkoxysilane functionalized monomer includes, for example, vinyltrialkoxysilanes such as vinyltrimethoxysilane; alkylvinyldialkoxysilanes; (meth)acryloxyalkyltrialkoxy-silanes; such as (meth)acryloxyethyltrimethoxysilane and (meth)acryloxypropyl-trimethoxysilane; and the derivatives thereof.

The alkoxysilane functionality monomer may be added during the copolymerization of the copolymer or after the copolymerization of at least one ethylenically unsaturated nonionic monomer and at least one alkoxysilane-capable precursor monomer. By "alkoxysilane-capable precursor monomer" herein refers to a monomer that has a reactive group capable of, after copolymerization, reacting with an alkoxysilane containing compound to yield an alkoxysilane-containing functional group attached to the copolymer, for example, a copolymer containing, as a copolymerized unit, an epoxy silane or an amino silane to form a silane containing copolymer.

The polymerization techniques used to prepare the copolymer are well known in the art, for example an emulsion polymerization. In the emulsion polymerization process, conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Either thermal or redox initiation processes may be used. The reaction temperature is maintained at a temperature lower than 100° C. throughout the course of the reaction. Preferred is a reaction temperature between 30° C. and 95° C., more preferably between 50° C. and 90° C. The monomer mixture may be added neat or as an emulsion in water. The monomer mixture may be added in one or more additions or continuously, linearly or not, over the reaction period, or combinations thereof.

Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used. Chelating agents for the metals may optionally be used.

Buffer is optionally used in the present invention. It is a kind of salt and used to control the in process pH value during polymerization reaction. General buffer salt includes phosphates, citrates, acetates bicarbonate and carbonates. The counter ion may be sodium, potassium, and ammonium ion. Buffer may be added in one or more additions or continuously, linearly or not, over most or all of the entire reaction period or during limited portion(s) of the reaction period. The in process pH value may be controlled between 2 to 7 using buffer. A preferred in process pH value is between 2 to 5. More Preferred in process pH value is between 2 to 4.

Chain transfer agents such as, for example, halogen compounds such as tetrabromomethane; allyl compounds; or mercaptans such as alkyl thioglycolates, alkyl mercaptoalkanoates, and $C_4$-$C_{22}$ linear or branched alkyl mercaptans may be used to lower the molecular weight of the emulsion polymer and/or to provide a different molecular weight distribution than would otherwise have been obtained with any free-radical-generating initiator(s). Chain transfer agent(s) may be added in one or more additions or continuously, linearly or not, over most or all of the entire reaction period or during limited portion(s) of the reaction period such as, for example, in the kettle charge and in the reduction of residual monomer stage. Chain transfer agents are typically used in the amount of 0 to 5 wt %, based on the total weight of monomer used to form the aqueous copolymer dispersion. A preferred level of chain transfer agent is from 0.01 to 0.5, more preferably from 0.02 to 0.4 and most preferably from 0.05 to 0.2 mole %, based on the total number of moles of monomer used to form the aqueous copolymer dispersion.

In another embodiment of the present invention the aqueous emulsion polymer may be prepared by a multistage emulsion polymerization process, in which at least two stages differing in composition are polymerized in sequential fashion. Such a process sometimes results in the formation of at least two mutually incompatible polymer compositions, thereby resulting in the formation of at least two phases within the polymer particles. Such particles are composed of two or more phases of various geometries or morphologies such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. In the case of a multi-staged polymer particle the Tg for the purpose of this invention is to be calculated by the Fox equation as detailed herein using the overall composition of the emulsion polymer without regard for the number of stages or phases therein. Similarly, for a multi-staged polymer particle the amount of the monomers shall be determined from the overall composition of the emulsion polymer without regard for the number of stages or phases therein. For example, the first stage composition primarily comprises of styrene and the second stage comprises of the composition described by this invention. Furthermore, the core of the copolymer particle may be hollow (i.e., air void). The polymerization techniques used to prepare such multistage emulsion polymers are well known in the art such as, for example, U.S. Pat. Nos. 4,325,856; 4,654,397; and 4,814,373. Preferably, the monomer is contained in only one step of the multistage emulsion polymerization.

The average particle diameter of the copolymer dispersion particles is from 50 to 350 nanometers, preferably from 50 to 300 nanometers, as measured by a BI-90 Particle Sizer.

Colloidal silica particles, which here also are referred to as silica sols, may be derived from e.g. precipitated silica, micro silica (silica fume), pyrogenic silica (fumed silica) or silica gels with sufficient purity, and mixtures thereof.

Colloidal silica particles and silica sols according to the invention may be modified and can contain other elements such as amines, aluminium and/or boron, which can be present in the particles and/or the continuous phase. Boron-modified silica sols are described in e.g. U.S. Pat. No. 2,630,410. The aluminium modified silica particles suitably have an $Al_2O_3$ content of from about 0.05 to about 3 wt %, preferably from about 0.1 to about 2 wt %. The procedure of preparing an aluminium modified colloidal silica is further described in e.g. "The Chemistry of Silica", by Iler, K. Ralph, pages 407-409, John Wiley & Sons (1979) and in U.S. Pat. No. 5,368,833.

The colloidal silica particles suitably have an average particle diameter ranging from about 2 to about 150 nm, preferably from about 3 to about 50 nm, and most preferably from about 5 to about 40 nm. Suitably, the colloidal silica particles have a specific surface area from about 20 to about 1500, preferably from about 50 to about 900, and most preferably from about 70 to about 600 $m^2/g$.

The colloidal silica particles preferably have a narrow particle size distribution, i.e. a low relative standard deviation of the particle size. The relative standard deviation of the particle size distribution is the ratio of the standard deviation of the particle size distribution to the mean particle size by numbers. The relative standard deviation of the particle size distribution preferably is lower than about 60% by numbers, more preferably lower than about 30% by numbers, and most preferably lower than about 15% by numbers.

The colloidal silica particles are dispersed in a substantially aqueous solvent, suitably in the presence of stabilising cations such as $K^+$, $Na^+$, $Li^+$, $NH_4^+$, organic cations, primary, secondary, tertiary, and quaternary amines, and mixtures thereof so as to form an aqueous silica sol. However, also dispersions comprising organic solvents miscible with water, e.g. lower alcohols, acetone or mixtures thereof may be used, preferably in an amount of from about 1 to about 20, more preferably from about 1 to about 10, and most preferably from about 1 to about 5 volume percent of the total volume. However, aqueous silica sols without any further solvents are preferably used. Preferably, the colloidal silica particles are negatively charged. Suitably, the silica content in the sol is from about 20 to about 80, preferably from about 25 to about 70, and most preferably from about 30 to about 60 wt %. The higher the silica content, the more concentrated the resulting colloidal silica dispersion. The pH of the colloidal silica suitably is from about 1 to about 13, preferably from about 6 to about 12, and most preferably from about 7.5 to about 11. However, for aluminium-modified silica sols, the pH suitably is from about 1 to about 12, preferably from about 3.5 to about 11.

The colloidal silica preferably has an S-value from about 20 to about 100, more preferably from about 30 to about 90, and most preferably from about 60 to about 90.

It has been found that dispersions with an S-value within these ranges can improve the stability of the resulting dispersion. The S-value characterises the extent of aggregation of colloidal silica particles, i.e. the degree of aggregate or microgel formation. The S-value has been measured and calculated according to the formulas given in J. Phys. Chem. 60(1956), 955-957 by Iler, R. K. & Dalton, R. L.

The S-value depends on the silica content, the viscosity, and the density of the silica sol. A high S-value indicates a low microgel content. The S-value represents the amount of SiO2 in percent by weight present in the dispersed phase of the silica sol. The degree of microgel can be controlled during the production process as further described in e.g. U.S. Pat. No. 5,368,833.

The colloidal silica is gradually added to polymer with agitation or polymer is gradually added to the colloidal silica. The polymer is mixed with colloidal silica particles in a weight ratio of polymer to silica 0.2 to 5, more preferably from about 0.5 to 3, and most preferably from about 1 to 2. The mixture temperature preferred from 0 to 50° C., more preferred from 20 to 40° C.

Neutralizer is used to keep the final pH value of the hybrid binder higher than 8.5, preferred from 8.5 to 11, more preferred from 9.0 to 10. Organic amines or water-soluble inorganic bases are suitable neutralizers employed in the present invention. Preferably used neutralizers include, but are not limited to N-methylmorpholine, triethylamine, dimethylethanolamine, dimethylisopropanolamine, methyl-di-ethanolamine, triethanolamine or ethyl-di-isopropylamine, diethyl-ethanolamine, butanolamine, morpholine, 2-aminomethyl-2-methyl-propanol (AMP), isophoronediamine, or ammonium hydroxide ($NH_4OH$). Most preferred neutralizers are 2-aminomethyl-2-methyl-propanol (AMP), and ammonium hydroxide.

Neutralizers might be added under the temperature between 0 to 50° C., preferably, from 20 to 40° C. In one application, the hybrid binder of the present invention is used in an aqueous coating composition.

The aqueous coating composition of the present invention contains at least one conventional coatings adjuvant, including but not limited to, coalescing agents, cosolvents, surfactants, buffers, neutralizers, thickeners, non-thickening rheology modifiers, dispersants, humectants, wetting agents, midewcides, biocides, plasticizers, antifoaming agents, defoaming agents, anti-skinning agents, colorants, flowing agents, crosslinkers, anti-oxidants.

The aqueous coating composition formulating involves the process of selecting and admixing appropriate coating ingredients in the correct proportions to provide a paint with specific processing and handling properties, as well as a final dry paint film with the desired properties.

The aqueous coating composition may be applied by conventional application methods such as, for example, brushing, roller application, and spraying methods such as, for example, air-atomized spray, air-assisted spray, airless spray, high volume low pressure spray, and air-assisted airless spray.

Suitable substrates include, but not limited to, for example, concrete, cement board, MDF and particle board, gypsum board, wood, stone, metal, plastics, wall paper and textile, etc. preferably, all the substrate are pre-primed by waterborne or solvent borne primers.

The aqueous coating composition and its application method may influence the effectivity of this patent. When the hydrophilic substances in aqueous coating compositions are too much, then the property of the liquid stain repellency is poor. Similarly, in its application, when the concentration of hydrophilic substances on the dry paint film surface is too much, the property of the liquid stain repellency is poor.

EXAMPLES

I. Raw Materials

| A) Starting materials used | |
|---|---|
| Abbr. | Chemicals |
| BA | Butyl Acrylate |
| 2-EHA | 2-Ethylhexyl Acrylate |
| MMA | Methyl Methacrylate |
| (M)AA | (Meth)acrylic Acid |
| AM | Acrylamide |
| APS | Ammonium persulfate |
| DBS | sodium dodecyl benzene sulfonate |
| AMP | 2-methyl-2-amino-propanol |

| B) colloidal silica | |
|---|---|
| Abbr. | Company |
| NS-30 | ZHEJIANG YUDA CHEMICAL INDUSTRY CO., LTD |
| Bindzil ® CC-40 | Eka Chemical |
| LUDOX ® TM-40 | W. R. Grace & Co. |
| Bindzil ® 40/130 | Eka Chemical |
| Bindzil ® 2040 | Eka Chemical |
| Bindzil ® 2034DI | Eka Chemical |

II. Test Method of Surface and Serum Phase Acid Value

1. Sample Preparation

Weight 17.5 g of latex was diluted with deionized water to 35 g and centrifuged at 18,500 rpm at 4° C. for 2 hours. After centrifugation, clear supernatant was carefully decanted. Dilute 17.5 g of the supernatant with deionized water to 30 g. The polymer was collected and then re-dispersed in 30 g deionized water.

2. Titration of Samples with 0.50N KOH:

The pH of the diluted supernatant was adjusted to pH=1.0 with 0.5N HCl and titrated with 0.50N KOH with Radiometer TTT 80 titrator (by Radiometer America), RHM 84 Research pH meter (by Radiometer America) and autoburette ABU80 titrating system (by Radiometer America). The serum phase acid value (mg KOH/g dried polymer) is equal to the volume of KOH for diluted supernatant sample (ml between two peaks of the first derivatives of the titration curve)×(0.5N)×56/(17.5×(solids of latex)).

The re-dispersed polymer was also titrated using the similar method. The surface acid value (mg KOH/g dried polymer) is equal to the volume of KOH for re-dispersed polymer (ml between two peaks of the first derivatives of the titration curve)×(0.5N)×56/(17.5×(solids of latex)).

Example 1

An aqueous hybrid binder A was prepared by following process: A monomer emulsion was prepared by combining 318.3 g BA, 452.3 g 2-EHA, 889.1 g MMA, 15.56 g MAA, 31.38 g 20% DBS solution, and 540 g DI water and emulsified with stirring. Next, 13.22 g 20% by weight aqueous solution of DBS and 860 g DI water were charged to a five liter multi-neck flask fitted with mechanical stirring. The contents of the flask were heated to 90° C. under a nitrogen atmosphere. To the stirred flask, 60 g of the monomer emulsion, 5.05 g APS were added in 23.9 g DI water. The remaining monomer emulsion and 125 g DI water were added gradually over 90 minutes. Reactor temperature was maintained at 88° C. Next, 36 g DI water was used to rinse the emulsion feed line to the reactor. Thereafter, the reaction mixture was stirred at reaction temperature for one hour more and then cooled to room temperature. Then the polymer was added to 2797.3 g colloidal silica Bindzil® 2040 (40% active) over 30 minutes with agitation. The final pH value was adjusted to 9.5 using AMP to get hybrid binder A. The solid of hybrid binder A was 44.3%. The surface acid value of polymer is 1.75 mg KOH/g dried polymer, the serum phase acid value of polymer is 0.24 mg KOH/g dried polymer.

Example 2

An aqueous hybrid binder B was prepared in a similar procedure to aqueous hybrid binder A (Example 1). The polymer was prepared from a monomer emulsion containing 318.3 g BA, 452.3 g 2-EHA, 881.3 g MMA, 23.34 g MAA, 31.38 g 20% DBS solution, and 540 g DI water. Polymer was added to 2797.3 g colloidal silica Bindzil® 2040 (40% active) over 30 minutes with agitation. The final pH value was adjusted to 9.3 using AMP to get hybrid binder B. The solid of hybrid binder B was 44.6%. The surface acid value of polymer was 2.68 mg KOH/g dried polymer, the serum phase acid of polymer is 1.08 mg KOH/g dried polymer.

Example 3

An aqueous hybrid binder C was prepared in a similar procedure to aqueous hybrid binder A (Example 1). Polymer was prepared from a monomer emulsion containing 318.3 g BA, 452.3 g 2-EHA, 871.2 g MMA, 33.51 g MAA, 31.38 g 20% DBS solution, and 540 g DI water. Polymer was added to 2797.3 g colloidal silica Bindzil® 2040 (40% active) over 30 minutes with agitation. Then the final pH value was adjusted to 9.3 using AMP to get hybrid binder C. The solid of hybrid binder C was 44.7%. The surface acid value of polymer was 3.17 mg KOH/g dried polymer, the serum phase acid value of polymer was 1.09 mg KOH/g dried polymer.

Example 4

An aqueous hybrid binder D was prepared in a similar procedure to aqueous hybrid binder C (Example 3). The final pH value was adjusted to 10 using AMP to get hybrid binder D. The solid of hybrid binder D was 44.6%.

Example 5

A hybrid binder E was prepared by following process: A monomer emulsion was prepared by combining 707.2 g EHA, 941.8 g MMA, 25.51 g MAA, 8.38 g AM, 31.38 g 20% DBS solution, and 540 g DI water, and emulsified with stirring. Next, 13.22 g 20% by weight aqueous solution of DBS and 860 g DI water were charged to a five liter multi-neck flask fitted with mechanical stirring. The contents of the flask were heated to 90° C. under a nitrogen atmosphere. To the stirred flask, 60 g of the monomer emulsion were added, followed by 2.51 g Na$_2$CO$_3$ buffer in 23.9 g DI water, 5.05 g APS in 23.9 g DI water. The remaining monomer emulsion and 125 g DI water were added gradually over 90 minutes. Reactor temperature was maintained at 88° C. Next, 36 g DI water was used to rinse the emulsion feed line to the reactor. Thereafter, the reaction mixture was stirred at reaction temperature for one hour more and then cooled to room temperature. Then the polymer was added to 2797.3 g colloidal silica Bindzil® 2040 (40% active) over 30 minutes. Then the final pH value was adjusted to 9.5 using AMP to get hybrid binder E. The solid of hybrid binder E was 45.8%. The surface acid value for polymer was 3.42 mg KOH/g dried polymer, the serum phase acid value was 1.5 mg KOH/g dried polymer.

Example 6

An aqueous hybrid binder F was prepared in a similar procedure to aqueous hybrid binder E (Example 5). Polymer was added to 2797.3 g colloidal silica LUDOX® TM-40 (40% active) over 30 minutes. Then the final pH value was adjusted to 9.2 using NH4OH (25% active) to get hybrid binder F. The solid of hybrid binder F was 45.5%.

Example 7

An aqueous hybrid binder G was prepared in a similar procedure to aqueous hybrid binder E (Example 5). Polymer was added to 2797.3 g colloidal silica Bindzil® CC-40 (40% active) over 30 minutes. Then the final pH value was adjusted to 8.5 using NH4OH (25% active) to get hybrid binder G. The solid of hybrid binder F was 45.3%.

Comparative Example 8

An aqueous hybrid binder H was prepared in a similar procedure to aqueous hybrid binder E (Example 5). Polymer was added to 3279.3 g colloidal silica NS-30 (30% active) over 30 minutes. Then the final pH value was adjusted to 8.0 using NH4OH (25% active) to get hybrid binder H. The solid of hybrid binder F was 38.7%.

Comparative Example 9

An aqueous hybrid binder I was prepared in a similar procedure to aqueous hybrid binder A (Example 1). Polymer was prepared from a monomer emulsion containing 318.3 g BA, 452.3 g 2-EHA, 896.9 g MMA, 7.78 g MAA, 31.38 g 20% DBS solution, and 540 g DI water. Polymer was added to 2797.3 g colloidal silica Bindzil® 2040 (40% active) over 30 minutes with agitation. The final pH value was adjusted to 9.5 using AMP to get hybrid binder I. The solid of hybrid binder I was 44.5. The surface acid value of polymer was 0.98 mg KOH/g dried polymer, the serum phase acid of polymer is 0.07 mg KOH/g dried polymer.

Comparative Example 10

An aqueous hybrid binder J was prepared in a similar procedure to aqueous hybrid binder A (Example 1). Polymer was prepared with two stage polymer. First stage monomer emulsion was prepared from 696.9 g MMA, 255.06 BA, 361.86 g 2-EHA, 33.51 g MAA, 25.10 g DBS (20% active) and 432 g water. Second stage monomer emulsion was prepared from 180.9 g MMA, 63.66 g BA, 90.47 EHA, 6.28 g 20% DBS solution, and 108 g water. After first stage monomer emulsion feeding, added 3.5 g NH$_4$OH (25% active) to adjust the pH value to 6.0. Second stage polymer was feed into reactor with same speed. Polymer was gradually added to 2797.3 g colloidal silica Bindzil® 2040 and the final pH value was adjusted to 9.3 using AMP to get hybrid binder J. The solid of hybrid binder J was 44.5%. The surface acid value of polymer was 4.24 mg KOH/g dried polymer, the serum phase acid value was 1.0 mg KOH/g dried polymer.

Comparative Example 11

An aqueous hybrid binder K was prepared in a similar procedure to aqueous hybrid binder C (Example 3). Polymer was prepared with same monomer emulsion (example 3) and 3.36 g $Na_2CO_3$ buffer in 23.9 g DI was added to kettle before monomer feeding. Polymer was gradually added to 2797.3 g colloidal silica Bindzil® 2040 (40% active) over 30 minutes with agitation. The final pH value was adjusted to 9.5 using AMP to get hybrid binder K. The solid of hybrid binder K was 44.8%. The surface acid value of polymer was 4.73 mg KOH/g dried polymer, the serum phase acid value was 1.5 mg KOH/g dried polymer.

Comparative Example 12

An aqueous hybrid binder L was prepared in a similar procedure to aqueous hybrid binder A (Example 1). Polymer was prepared from a monomer emulsion containing 837.6 g BA, 820.9 g MMA, 16.75 g MAA, 31.38 g 20% DBS solution, and 540 g DI water and 5.86 g $Na_2CO_3$ in 23.9 g water was added to kettle before monomer feeding. Polymer was gradually added to 2797.3 g colloidal silica Bindzil® 2040 (40% active) over 30 minutes with agitation. The final pH value was adjusted to 9.5 using AMP to get hybrid binder L. The solid of hybrid binder L was 44.7%. The surface acid value of polymer was 6.2 mg KOH/g dried polymer, the serum phase acid value was 2.39 mg KOH/g dried polymer.

III. Test Procedures

Paint Formulation

Paints containing different hybrid binders were prepared using the following procedure as shown in Table 1 and Table 2. The ingredients listed in Table 1 and Table 2 (grind) were mixed using a high speed Cowles disperser. The ingredients listed in Table 1 and Table 2 (let down) were added using a conventional lab mixer.

TABLE 1 paint 1# formulation

| Material | Weight(g) |
|---|---|
| Grind | |
| Water | 23.08 |
| Propylene Glycol | 22.26 |
| In Can Biocide | 0.82 |
| Surfactant | 2.02 |
| Defoamer | 0.45 |
| Dispersant | 6.05 |
| TiO2 | 201.76 |
| Letdown | |
| Hybrid binder | 640.00 |
| TEXANOL ™ | 25.98 |
| Surfactant | 2.00 |
| Dry Film Biocide | 7.00 |
| Water | 30.00 |
| Thickener A | 2.70 |
| Thickener B | 15.00 |
| AMP | 1.00 |
| Total | 980.12 |

TABLE 2 paint 2# formulation

| Material | Weight(g) |
|---|---|
| Grind | |
| Water | 80 |
| Propylene Glycol | 10 |
| Defomer | 0.5 |
| Surfactant | 1.0 |
| Dry Film Biocide | 3.5 |
| Dispersant | 2.5 |
| Thickener A | 1.25 |
| Amine | 0.1 |
| TiO2 | 105 |
| Calcium carbonate | 40 |
| Letdown | |
| Hybrid Binder | 640.00 |
| Ropaque Polymer | 15 |
| TEXANOL ™ | 8.57 |
| Deformer | 0.5 |
| Dry Film Biocide | 0.5 |
| Water | 10 |
| Thickener A | 1.5 |
| Ammonium (28%) | 1 |
| Total | 920.92 |

Paint Stability Test

The paints were prepared from hybrid binder following the recipe in Table 2 and Table 3. The paint was stored at room temperature overnight after preparation. Krebs Unit (KU) viscosity was recorded using a stormer-type viscometer (along the lines of ASTM D562). The paint was put in 50° C. oven for 10 days, then cooled to room temperature overnight. The brookfield visocity of paint after heatage was tested as KU2. ΔKU=Mean (KU2-KU1), which represent the storage stability of paint. The threshold of ΔKU was set around ±10 which had acceptable for the paint storage stability.

TABLE 3 the influence of surface and serum phase acid of polymer, and final pH on the stability of paint

| | Surface acid of polymer mg KOH/g dried polymer | Serum phase acid of polymer mg KOH/g dried polymer | Colloidal silica | | Neutralizer | | ΔKu (10 days) | |
|---|---|---|---|---|---|---|---|---|
| | | | Type | Ratio (Dried polymer/Dried Silica) | Type | pH value | paint 1# | paint 2# |
| Hybrid binder A | 1.75 | 0.24 | Bindzil® 2040 | 1.5 | AMP | 9.5 | 2 | 0.5 |

TABLE 3-continued the influence of surface and serum phase acid of polymer, and final pH on the stability of paint

| | Surface acid of polymer mg KOH/g dried polymer | Serum phase acid of polymer mg KOH/g dried polymer | Colloidal silica | | Neutralizer | | ΔKu (10 days) | |
|---|---|---|---|---|---|---|---|---|
| | | | Type | Ratio (Dried polymer/Dried Silica) | Type | pH value | paint 1# | paint 2# |
| Hybrid binder B | 2.68 | 1.08 | Bindzil ® 2040 | 1.5 | AMP | 9.3 | 6 | 8 |
| Hybrid binder C | 3.17 | 1.09 | Bindzil ® 2040 | 1.5 | AMP | 9.3 | 8 | 5 |
| Hybrid binder D | 3.17 | 1.09 | Bindzil ® 2040 | 1.5 | AMP | 10.0 | 3 | 2 |
| Hybrid binder E | 3.43 | 1.5 | Bindzil ® 2040 | 1.5 | AMP | 9.5 | 8 | 9 |
| Hybrid binder F | 3.43 | 1.5 | LUDOX ® TM-40 | 1.5 | NH4OH | 9.2 | -8 | —# |
| Hybrid binder G | 3.43 | 1.5 | Bindzil ® CC-40 | 1.5 | NH4OH | 8.5 | 3 | —# |
| Hybrid binder H | 3.43 | 1.5 | NS-30 | 1.5 | AMP | 8.0 | Gelled | Gelled |
| Hybrid binder I | 0.98 | 0.07 | Bindzil ® 2040 | 1.5 | AMP | 9.5 | 15 | —# |
| Hybrid binder J | 4.24 | 1.0 | Bindzil ® 2040 | 1.5 | AMP | 9.3 | 22 | 17 |
| Hybrid binder K | 4.73 | 1.5 | Bindzil ® 2040 | 1.5 | AMP | 9.5 | 31 | 40 |
| Hybrid binder L | 3.38 | 2.39 | Bindzil ® 2040 | 1.5 | AMP | 9.5 | 30 | —# | not tested

Table 3 shows the influence of surface acid, serum phase acid of polymer, the final pH value of hybrid binder on the storage stability of paint. When the surface acid of copolymer was between 1.0 and 4.0 mg KOH/g dried polymer, the serum phase acid value is below 2.3 mg KOH/g dried polymer, the final pH value is above 8.5, the paint prepared from hybrid binder shows good heatage stability.

The invention claimed is:

1. A stable aqueous hybrid binder comprising:
   a) at least one water dispersible polymer having a minimum film formation temperature of from −35° C. to 60° C. and comprising from 1 to 2.5 wt %, based on the dry weight of the polymer, copolymerized units of methacrylic acid;
   b) at least one colloidal silica; and
   c) an amount of neutralizer sufficient to maintain a pH value greater than or equal to 8.5;
   wherein the at least one water dispersible polymer and particles of the at least one colloidal silica are present in a weight ratio of 0.2:1 to 5:1;
   the surface acid value of the water dispersible polymer is from 1.0 to 4.0 mg KOH/g dried polymer, measured by centrifugation of the polymer, decanting a clear supernatant, redispersing the remaining polymer in deionized water, and titration with 0.50 N KOH; and
   the serum phase acid value of the water dispersible polymer is from 0 to 2.3 mg KOH/g dried polymer, measured by adjusting the pH of the clear supernatant to 1.0 with 0.5 N HCl, and titration with 0.50 N KOH.

2. The stable aqueous hybrid binder according to claim 1 wherein the surface acid value of the water dispersible polymer is from 1.75 to 3.43 mg KOH/g dried polymer.

3. The stable aqueous hybrid binder according to claim 1 wherein the serum phase acid value of the water dispersible polymer is from 0.07 to 1.5 mg KOH/g dried polymer.

4. The stable aqueous hybrid binder according to claim 1 wherein the colloidal silica is derived from precipitated silica, micro silica, pyrogenic silica, silica gels, or a mixture thereof.

5. The stable aqueous hybrid binder according to claim 1 wherein the pH value of the hybrid binder is from 8.5 to 11.

6. The stable aqueous hybrid binder according to claim 1 wherein the neutralizer is 2-aminomethyl-2-methyl-propanol, ammonium hydroxide, or a mixture thereof.

7. A new process for making the stable aqueous hybrid binder according to claim 1, comprising the steps of:
   mixing at least one water dispersible polymer with at least one colloidal silica;
   and adding a neutralizer in an amount sufficient to maintain a pH value greater than or equal to 8.5.

8. A coating composition comprising the stable aqueous hybrid binder according to claim 1, wherein a crosslinker is not present.

* * * * *